(12) United States Patent
Morimoto

(10) Patent No.: US 7,074,149 B2
(45) Date of Patent: Jul. 11, 2006

(54) TRANSMISSION FOR WHEEL TYPE WORKING VEHICLE

(75) Inventor: Tetsuya Morimoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 358 days.

(21) Appl. No.: 10/748,815

(22) Filed: Dec. 29, 2003

(65) Prior Publication Data

US 2004/0142784 A1  Jul. 22, 2004

(30) Foreign Application Priority Data

Jan. 16, 2003  (JP)  ............................. 2003-008314

(51) Int. Cl.
*F16H 47/04* (2006.01)
*F16H 47/00* (2006.01)
*B60K 17/356* (2006.01)

(52) U.S. Cl. ............................. 475/83; 475/72; 74/720; 180/243

(58) Field of Classification Search .................. 475/72, 475/74, 80, 83; 74/329, 347, 423, 718, 720, 74/730.1, 665 A–665 B; 180/242, 243, 297, 180/307

See application file for complete search history.

(56) References Cited

U.S. PATENT DOCUMENTS

| 6,086,501 | A |   | 7/2000  | Takatori et al. |            |
|-----------|---|---|---------|-----------------|------------|
| 6,196,348 | B1| * | 3/2001  | Yano et al.     | ... 180/242|
| 6,250,414 | B1| * | 6/2001  | Sato et al.     | ... 180/307|
| 6,336,513 | B1| * | 1/2002  | Hasegawa et al. | ... 180/6.2|
| 6,447,419 | B1| * | 9/2002  | Irikura et al.  | ... 475/24 |
| 6,668,964 | B1| * | 12/2003 | Braud           | ... 180/292|
| 6,848,530 | B1| * | 2/2005  | Tani            | ... 180/297|
| 6,860,354 | B1| * | 3/2005  | Hasegawa        | ... 180/242|
| 6,918,850 | B1| * | 7/2005  | Hasegawa et al. | ... 475/72 |
| 2002/0139597 | A1 |  | 10/2002 | Kinoshita et al. |         |

FOREIGN PATENT DOCUMENTS

| CA | 2 383 121 A1 | 11/2000 |
| DE | 1 149 625 B  | 5/1963  |
| DE | 199 54 894 A1| 12/2000 |
| EP | 0 831 251 A1 | 3/1998  |
| JP | 2002-362174 A| 12/2002 |
| JP | 2003-83420 A | 3/2003  |

* cited by examiner

*Primary Examiner*—Roger Pang
(74) *Attorney, Agent, or Firm*—Frishauf, Holtz, Goodman & Chick, P.C.

(57) ABSTRACT

A transmission for a wheel type working vehicle which makes it possible to reduce a size of a transmission mechanism for transmitting a mechanical driving force and a hydraulic driving force from the transmission to a front and rear wheel driving output shaft that is along a vehicle longitudinal direction. For this purpose, a bevel gear (49) and a cylindrical gear (50) are included at a front and rear wheel driving output shaft (20) for transmitting the mechanical driving force and the hydraulic driving force to front and rear wheels, and the front and rear wheel driving output shaft (20) is connected to an output shaft (21) of a mechanical transmission mechanism (15) via a bevel gear transmission mechanism (22), and is also connected to a hydraulic power transmission mechanism (24) connected to a hydraulic motor (17) via a cylindrical gear transmission mechanism (25).

10 Claims, 6 Drawing Sheets

F I G. 2
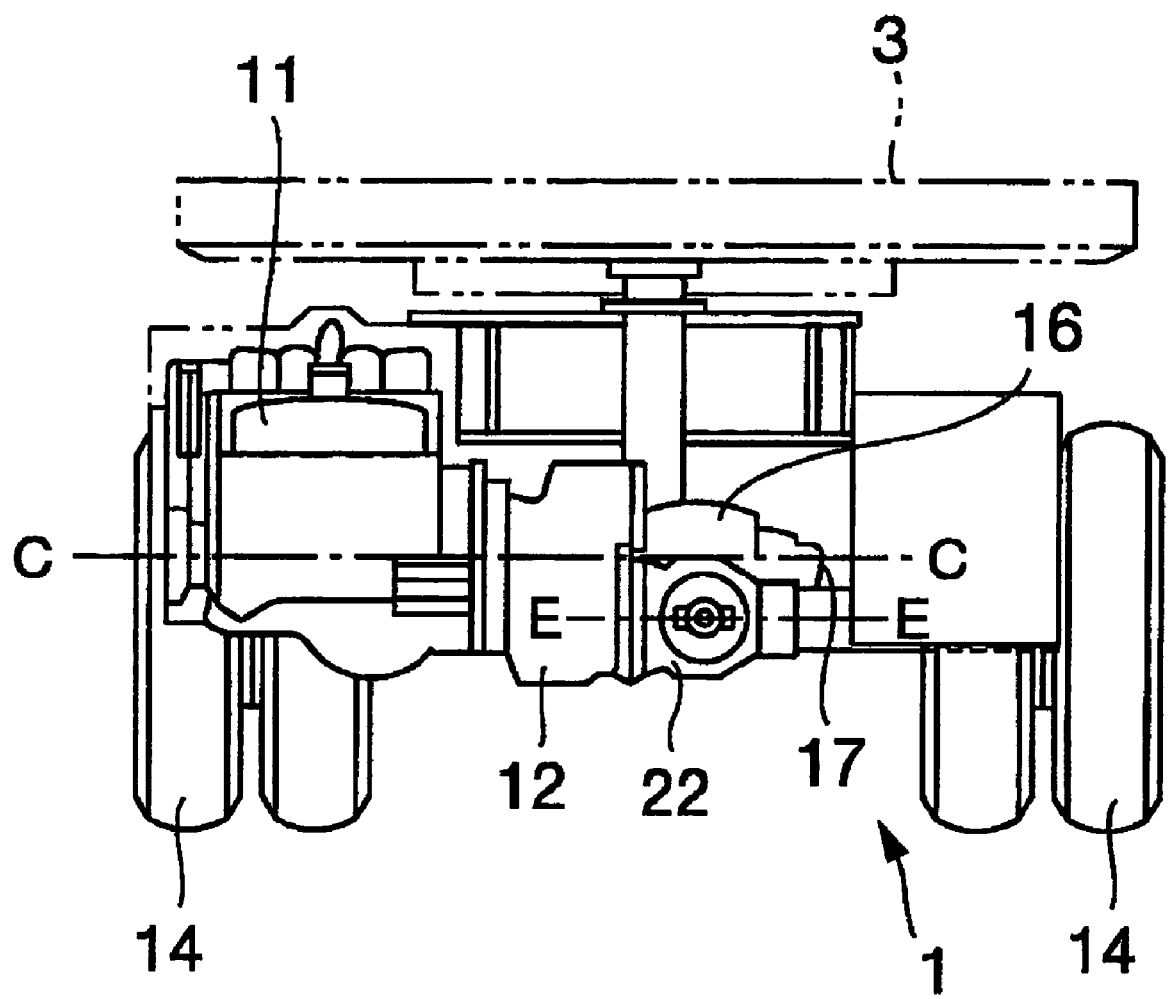

(FRONT SIDE)

TRANSMISSION FOR WHEEL TYPE WORKING VEHICLE

TECHNICAL FIELD

The present invention relates to a transmission for a wheel type working vehicle, and particularly relates to a transmission for a wheel type working vehicle capable of selectively transmitting a mechanical driving force and a hydraulic driving force to differential devices of front and rear wheels of the vehicle with an engine and the transmission being integrally connected and mounted on a lower part of a vehicle chassis frame.

BACKGROUND ART

A wheel type working vehicle, in which a driving unit, in which an engine, and a mechanical-hydraulic transmission (hereinafter, simply called a transmission) capable of selectively switching a mechanical driving force and a hydraulic driving force by switching a clutch in accordance with traveling ranges of a plurality of gears are integrally connected without interposing a torque converter, is placed on a lower part of a chassis frame, is proposed, and the one is disclosed in, for example, patent document 1. FIG. 5 and FIG. 6 is a plane view of a base carrier of a wheel type working vehicle disclosed in patent document 1, and a schematic view of its power train. Here, patent document 1 is Japanese Patent Laid-open No. 2002-362174, and the wheel type working vehicle is disclosed especially on pages 5 to 6, FIG. 1, and FIG. 3.

In FIG. 5 and FIG. 6, an engine 80 is placed at a right side of a chassis frame 81 with its output shaft axis C—C facing in a lateral direction of the vehicle. A transmission 82 is placed on a lower part in the chassis frame 81 in a direction of an output shaft 81a of the engine 80. The output shaft 80a of the engine 80 is integrally connected to the transmission 82. A front and rear wheel driving output shaft 98 having a rear output shaft 98a and a front output shaft 98b is placed in a longitudinal direction of the vehicle at a left side of the transmission 82. The rear output shaft 98a and the front output shaft 98b are connected to a rear and a front wheel axles 85a and 85b via propeller shafts 95a and 95b, and differential devices 86a and 86b, respectively.

The transmission 82 includes a first input shaft 87 connected to the output shaft of the engine 80, a first intermediate shaft 88, and an output shaft 89 (shown by an output shaft axis E—E in FIG. 5) to be in parallel. The shafts 87, 88 and 89 are provided respectively with a deceleration gear train 90 and speed change gear clutches 92, 93 and 94. Power of the engine 80 is mechanically shifted and transmitted to the output shaft 89 via the deceleration gear train 90 and each of the speed change gear clutches 92, 93 and 94. The transmission 82 includes a second input shaft 96, and a second intermediate shaft 97. A hydraulic motor 84, which receives discharge oil of a hydraulic pump 83 connected to an opposite side from the engine 80 in the first input shaft 87 and is rotationally driven via a control valve (not shown), is connected to the second input shaft 96. The second input shaft 96 and the second intermediate shaft 97 are provided with a deceleration gear train 99 and a speed change gear clutch 91. A hydraulic driving force of the hydraulic motor 84 is transmitted to the output shaft 89 via the deceleration gear train 99 and the speed change gear clutch 91.

A shaft 101 provided with a bevel gear 102 is connected to the output shaft 89, and the bevel gear 102 is meshed with a bevel gear 103 provided at the rear output shaft 98a. An output power of the output shaft 89 of the transmission 82 is transmitted to the rear output shaft 98a via the bevel gears 102 and 103. The rear output shaft 98a is selectively connected to the front output shaft 98b via a mechanical clutch mechanism 104.

According to the above-described constitution, when only the speed change gear clutch 91 is engaged, the speed is in a low-speed traveling range of a first speed gear, and the driving force of the hydraulic motor 84 is outputted from the output shaft 89 via the deceleration gear train 99 and the second intermediate shaft 97. When the speed change gear clutches 92, 93, and 94 are individually engaged respectively, the speed is in a high-speed traveling range of the second, third and fourth speed gear, and the driving force of the engine 80 is outputted from the output shaft 89 via the deceleration gear train 90 and the first intermediate shaft 88. Namely, the mechanical driving force and the hydraulic driving force are constituted so as to be outputted from the common output shaft 89.

In the transmission disclosed in patent document 1, the mechanical driving force and the hydraulic driving force are outputted to the front and rear wheel driving output shaft 98 via the common output shaft 89 and the bevel gears 102 and 103. Thus, in order to stand driving at a low-speed with high torque at the time of hydraulic driving, the output shaft 89 and the bevel gears 102 and 103 have to transmit a hydraulic driving power with a large torque capacity, and therefore it becomes necessary to increase the output shaft 89 and the bevel gears 102 and 103 in size, thus causing the problem of the entire transmission becoming large.

SUMMARY OF THE INVENTION

The present invention is made in view of the above-described problems, and has its object to provide a transmission for a wheel type working vehicle which makes it possible to reduce a size of a transmission mechanism for transmitting a mechanical driving force and a hydraulic driving force from the transmission to a front and rear wheel driving output shaft along a vehicle longitudinal direction in a wheel type working vehicle in which rotation axes of the engine and the transmission are placed in a direction orthogonal to the vehicle longitudinal direction.

In order to attain the above-described object, a transmission of a wheel type working vehicle according to the present invention has: in a transmission for a wheel type working vehicle in which a mechanical transmission mechanism for mechanically transmitting power, and a hydraulic power transmission mechanism having a hydraulic pump and a hydraulic motor driven by the hydraulic pump to transmit hydraulic transmission power are provided side by side as power transmission mechanisms for transmitting power of an engine to front and rear wheels via a front and rear wheel driving output shaft; a constitution in that an output shaft of the mechanical transmission mechanism is provided in a direction orthogonal to a vehicle longitudinal direction; the front and rear wheel driving output shaft and an output shaft of the hydraulic power transmission mechanism are provided in the vehicle longitudinal direction; power from the output shaft of the mechanical transmission mechanism is transmitted to the front and rear wheel driving output shaft via a bevel gear transmission mechanism; and power from the output shaft of the hydraulic power transmission mechanism is transmitted to the front and rear wheel driving output shaft via a cylindrical gear transmission mechanism.

According to the above constitution, the mechanical driving force from the output shaft of the mechanical transmission mechanism is transmitted to the front and rear driving output shaft for transmitting the power to the front and rear wheels via the bevel gear transmission mechanism. As a result, the hydraulic driving force being driving with large torque at a low speed by the hydraulic motor of the hydraulic power transmission mechanism is directly transmitted via the cylindrical gear transmission mechanism without transmitted via the bevel gear transmission mechanism, and therefore the bevel gear transmission mechanism can be reduced in size.

In the transmission for the wheel type working vehicle, the bevel gear transmission mechanism may mesh a bevel gear provided at the front and rear wheel driving output shaft with a bevel gear connected to the output shaft of the mechanical transmission mechanism; and the cylindrical gear transmission mechanism may mesh a cylindrical gear provided at the front and rear wheel driving output shaft with a cylindrical gear provided at the output shaft of the hydraulic power transmission mechanism. According to this constitution, the front and rear wheel driving output shaft is equipped with the bevel gear of the bevel gear transmission mechanism and the cylindrical gear of the cylindrical gear transmission mechanism, and therefore the power from the output shaft of the mechanical transmission mechanism and the power from the output shaft of the hydraulic power transmission mechanism are directly transmitted to the front and rear wheel driving output shaft, thus making it possible to enhance the transmission efficiency. Since the front and rear wheel driving output shaft is constituted by one shaft, the constitution can be made compact.

In the transmission for the wheel type working vehicle: a mechanical transmission housing, which rotatably houses the output shaft of the mechanical transmission mechanism, and to which the hydraulic pump is mounted; and a power output housing, which rotatably houses the front and rear wheel driving output shaft and the output shaft of the hydraulic power transmission mechanism, and to which the hydraulic motor is mounted may be included; and the mechanical transmission housing and the power output housing may be constituted to be separate bodies, and may be integrally mounted to be attachable and detachable. According to this constitution, the power output housing which rotatably houses the front and rear wheel driving output shaft and the output shaft of the hydraulic power transmission mechanism is constituted to be a separate body from the mechanical transmission housing which rotatably houses the output shaft of the mechanical transmission mechanism, and is integrally mounted to the mechanical transmission housing with a bolt or the like to be attachable and detachable, and therefore production of the mechanical transmission housing and the power output housing is facilitated.

In the transmission for the wheel type working vehicle: the front and rear wheel driving output shaft may comprise a rear wheel driving output shaft which has the bevel gear and the cylindrical gear and always transmits rotating power to the rear wheels, and a front wheel driving output shaft which is selectively separated from or connected to the rear wheels driving output shaft via a clutch mechanism, and selectively transmits the rotating power to the front wheels; and the clutch mechanism may make it possible to switch between two drive and four drive. According to this constitution, traveling power of the hydraulic drive traveling and the mechanical drive traveling can be selectively transmitted to the rear wheels (two drive), or the front and rear wheels (four drive), and traveling according to the conditions of the traveling areas and working conditions can be selected.

In the transmission for the wheel type working vehicle: the rear wheel driving output shaft may be fitted to a rotating supporter at a rear wheel side via a first bearing; the front wheel driving output shaft may be fitted to a rotating supporter at a front wheel side via a second bearing; and the rotating supporters at the rear wheel side and the front wheel side may be respectively mounted to the power output housing to be attachable and detachable. According to this constitution, the rear wheel driving output shaft and the front wheel driving output shaft can be attached to and detached from the power output housing as units via the rotating supporters, respectively, and therefore assembly and disassembly are facilitated.

In the transmission for the wheel type working vehicle: the hydraulic power transmission mechanism may comprise a planetary gear type deceleration mechanism for stopping rotation of a ring gear by engagement of a hydraulic operating clutch, and outputting rotating power of the hydraulic motor from a planetary carrier via a sun gear included at an input shaft connected to an output shaft of the hydraulic motor by rotation and revolution of a planetary gear, and the output shaft of the hydraulic power transmission mechanism, which is provided on a same axis as that of the input shaft and integrally connected to the planetary carrier. According to this constitution, the hydraulic power transmission mechanism has the planetary gear type deceleration mechanism, and the output shaft of the hydraulic power transmission mechanism is integrally connected to the center of rotation of the planetary carrier of the planetary gear type deceleration mechanism, and therefore the hydraulic power transmission mechanism becomes compact in the radius direction.

BRIEF DESCRIPTION OF THE DRAWINGS

FIG. 2 is a sectional view taken along the line 2—2 in FIG. 1;

BEST MODE FOR CARRYING OUT THE INVENTION

Figure 1:
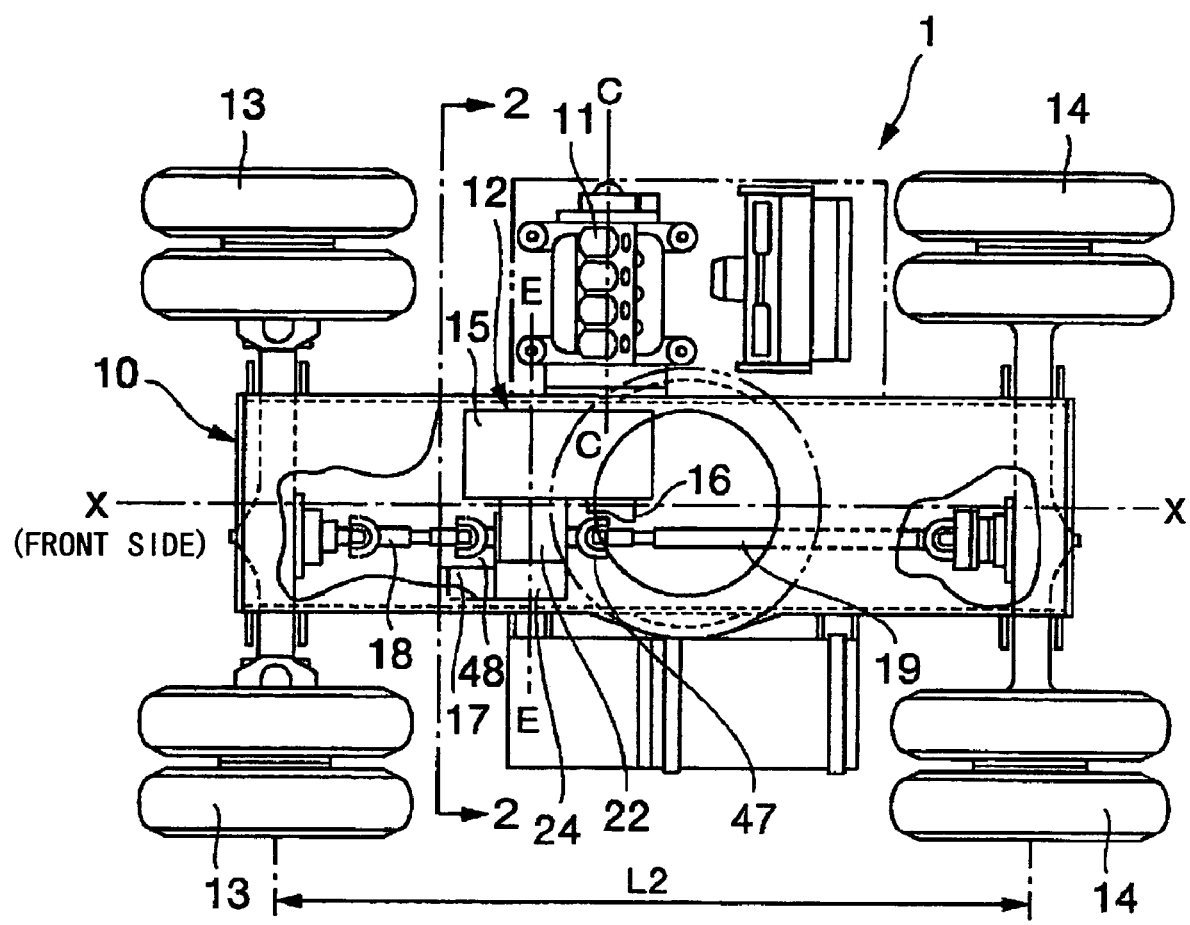
FIG. 1 is a partial sectional plane view of a base carrier of a wheel type working vehicle according to an embodiment of the present invention.

An embodiment of the present invention will be explained in detail below with reference to the drawings. FIG. 1 is a partial sectional plane view of a base carrier of a wheel type working vehicle according to the embodiment and FIG. 2 is a sectional view taken along the line 2—2 in FIG. 1. The explanation will be made, citing an example of a wheel type hydraulic shovel in which an upper revolving superstructure mounted with a working machine is rotatably loaded on a base carrier, as the wheel type working vehicle.

The wheel type hydraulic shovel has front wheels 13 and 13, and rear wheels 14 and 14 on the left and the right of lower front and rear parts of the base carrier 1, and an upper revolving superstructure 3 mounted with a working machine (not shown) constituted of a boom, an arm, a bucket and the like is rotatably loaded on an upper part of the base carrier 1. An engine 11 is mounted at either a left or right side position on a lower part of a chassis frame 10 of the base carrier 1 to be laterally placed with an engine output shaft axis C—C being in a direction orthogonal to a vehicle longitudinal direction (namely, a center line X—X in a vehicle longitudinal direction in the drawing). A transmission 12 is integrally connected to the engine 11, and the transmission 12 is housed in a lower part of an inside of the chassis frame 10.

A hydraulic pump 16 is mounted to an input shaft of the transmission 12, which is located on an extension line of the engine output shaft axis C—C, at an opposite side from the engine 11. An output shaft of a mechanical transmission mechanism 15 (hereinafter, called a transmission mechanism 15) of the transmission 12 is parallel with an input shaft of the transmission 12 (an axis of the input shaft is shown by the alternate long and short dash line in the drawing), and is provided at a position (the alternate long and short dash line in the drawing) at a predetermined space from the input shaft in the longitudinal direction of the vehicle. A bevel gear transmission mechanism 22 (hereinafter, called a bevel gear mechanism 22) is connected to this output shaft. The bevel gear mechanism 22 is for converting a power transmitting direction by the transmission mechanism 15 into the vehicle longitudinal direction from the direction of the engine output shaft axis C—C. A front and a rear wheel propeller shafts 18 and 19 are connected to a power output shaft (namely, a front and rear wheel driving output shaft 20) of the bevel gear mechanism 22, which is converted, via a propeller shaft joints 48 and 47. A hydraulic power transmission mechanism 24 meshed with the power output shaft with a cylindrical gear mechanism is placed at a side of the bevel gear mechanism 22. A hydraulic motor 17 is connected to an input shaft of the hydraulic power transmission mechanism 24. The rotational frequency of the hydraulic motor 17 is controlled by switching pressure oil discharged from a hydraulic pump 16 with a control valve (not shown).

Since the engine 11 is provided at the side in the lateral direction of the chassis frame 10, an allowance is provided in the inner space of the chassis 10, and a wheel base L2 of the front and rear wheels 13 and 14 is shortened to reduce a steering turning radius.

Figure 3:
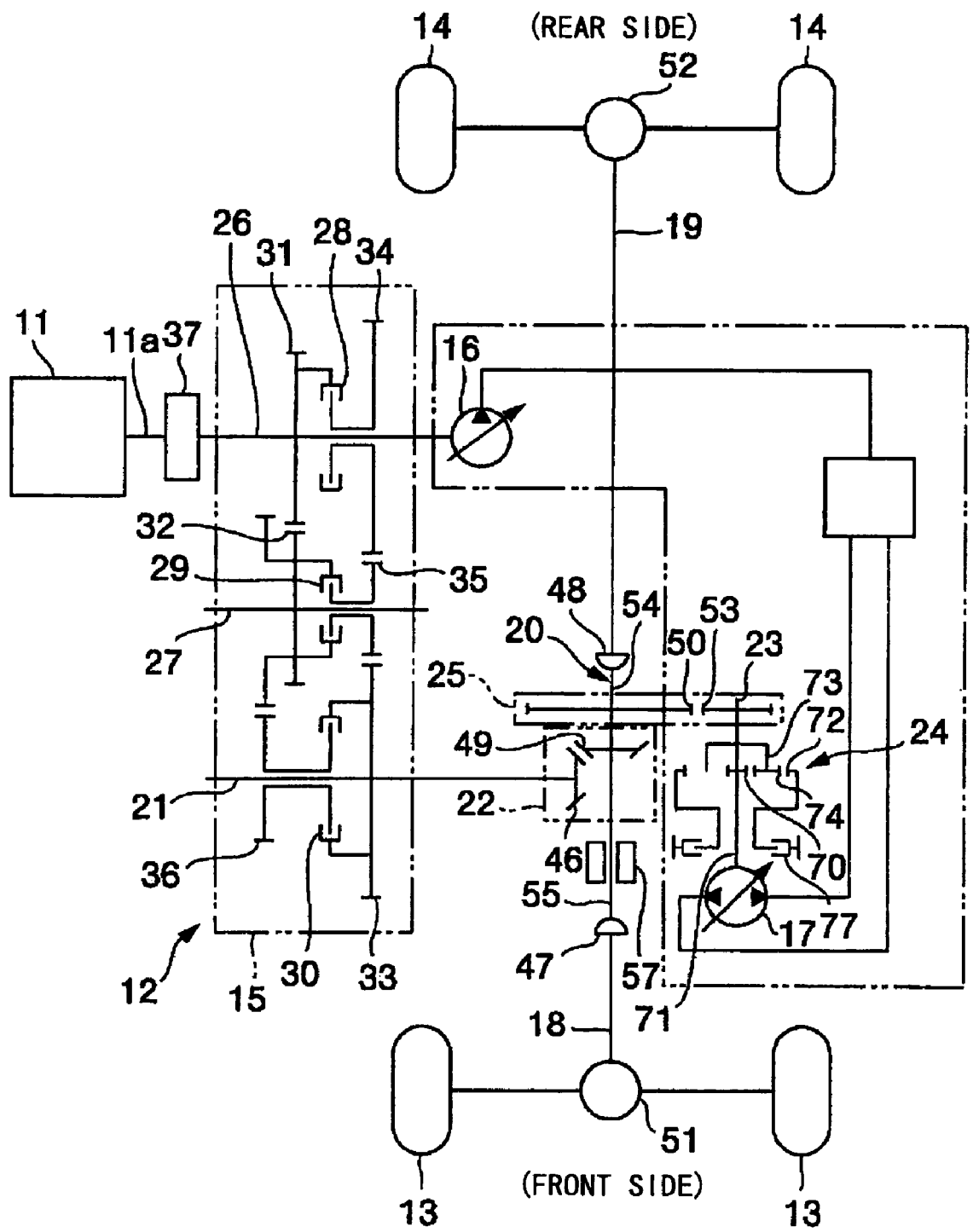
FIG. 3 is a schematic view of a transmission according to the embodiment.

As shown in FIG. 3, the transmission 12 has the transmission mechanism 15 for transmitting mechanical transmission power to the front and rear wheels 13 and 14 of the wheel type working vehicle, the variable displacement type hydraulic pump 16 mounted to the transmission mechanism 15 and connected to the engine 11, the variable displacement type hydraulic motor 17 driven by the discharge oil from the hydraulic pump 16 to output hydraulic transmission power, and the front and rear wheel driving output shaft 20 (hereinafter, called the driving output shaft 20) for transmitting a mechanical driving power by the transmission mechanism 15 and hydraulic driving power by the hydraulic motor 17 to the front and rear wheel propeller shafts 18 and 19. The driving output shaft 20 is placed in the direction orthogonal to the output shaft 21 of the transmission mechanism 15, and is connected to the output shaft 21 via the bevel gear mechanism 22. Consequently, the mechanical driving force from the transmission mechanism 15 is transmitted to the driving output shaft 20 via the bevel gear mechanism 22. The hydraulic power transmission mechanism 24 to which the hydraulic motor 17 is connected has a planetary gear type speed reducer provided at its input shaft, and an output shaft 23 connected to the planetary gear type speed reducer and mounted with a cylindrical gear 53 (a spur gear in this example). An axis direction of the output shaft 23 is placed in a direction parallel with an axis direction of the driving output shaft 20. The cylindrical gear 53 of the output shaft 23 is meshed with a cylindrical gear 50 (a spur gear in this example) mounted to the driving output shaft 20 to constitute a cylindrical gear transmission mechanism 25. According to this, the hydraulic driving force by the hydraulic motor 17 is transmitted to the driving output shaft 20 via the cylindrical gear transmission mechanism 25.

Based on FIG. 4, the transmission mechanism 15, the hydraulic power transmission mechanism 24 and the bevel gear mechanism 22 will be explained in detail. The transmission mechanism 15 includes an input shaft 26, an intermediate shaft 27 and an output shaft 21 rotatably inside a transmission housing 39 in directions orthogonal to the vehicle longitudinal direction (namely, an axis direction of the driving output shaft 20) and substantially horizontal. The input shaft 26, the intermediate shaft 27 and the output shaft 21 are placed in parallel with each other with a space from each other. The input shaft 26, the intermediate shaft 27 and the output shaft 21 are respectively provided with the transmission clutches 28, 29 and 30, and fixed gears 31, 32 and 33 fixed at the respective shafts, and free gears 34, 35 and 36 fitted to the respective shafts with play. A multiple shaft type mechanical transmission mechanism is constituted of these components.

The multiple shaft type mechanical transmission mechanism is constituted by meshing the fixed gear 31 of the input shaft 26 with the fixed gear 32 of the intermediate shaft 27, and the free gear 34 with the free gear 35, meshing the fixing gear 32 of the intermediate shaft 27 with the free gear 36 of the output shaft 21, and meshing the free gear 35 of the intermediate shaft 27 with the fixed gear 33 of the output shaft 21. According to this, the multiple shaft type mechanical transmission mechanism with forward three gears is provided. Namely, when the transmission clutch 28 of the input shaft 26 is engaged, the input shaft fixed gear 31 and the input shaft free gear 34 are connected to output the mechanical driving force of a specified deceleration ratio is outputted to the output shaft 21 via the intermediate shaft free gear 35 meshed with the input shaft free gear 34, and the output shaft fixed gear 33 meshed with the intermediate shaft free gear 35.

When the transmission clutch 29 of the intermediate shaft 27 is engaged, the intermediate fixed gear 32 and the intermediate shaft free gear 35 are connected. As a result, a rotating power inputted from the input shaft fixed gear 31 is outputted to the output shaft 21 as the mechanical power with a specified deceleration ration via the intermediate shaft fixed gear 32, and the output shaft fixed gear 33 meshed with the intermediate shaft free gear 35. When the transmission clutch 30 of the output shaft 21 is engaged, the output shaft fixed gear 33 and the output shaft free gear 36 are connected. As a result, rotating power inputted via the input shaft fixed gear 31 and the intermediate shaft fixed gear 32 is outputted to the output shaft 21 as the mechanical power with a specified deceleration ratio via the output shaft free gear 36 and the output shaft fixed gear 33.

The above-described multiple shaft type mechanical transmission mechanism is connected to an engine output shaft 11a via a torque damper joint 37 included at the input shaft 26, and the transmission housing 39 housing the input shaft 26, the intermediate shaft 27 and the output shaft 21 to be spaced from each other is connected to an engine housing 40 to be laid in the vehicle longitudinal direction, whereby the engine 11 and the transmission 12 are integrated.

Figure 4:
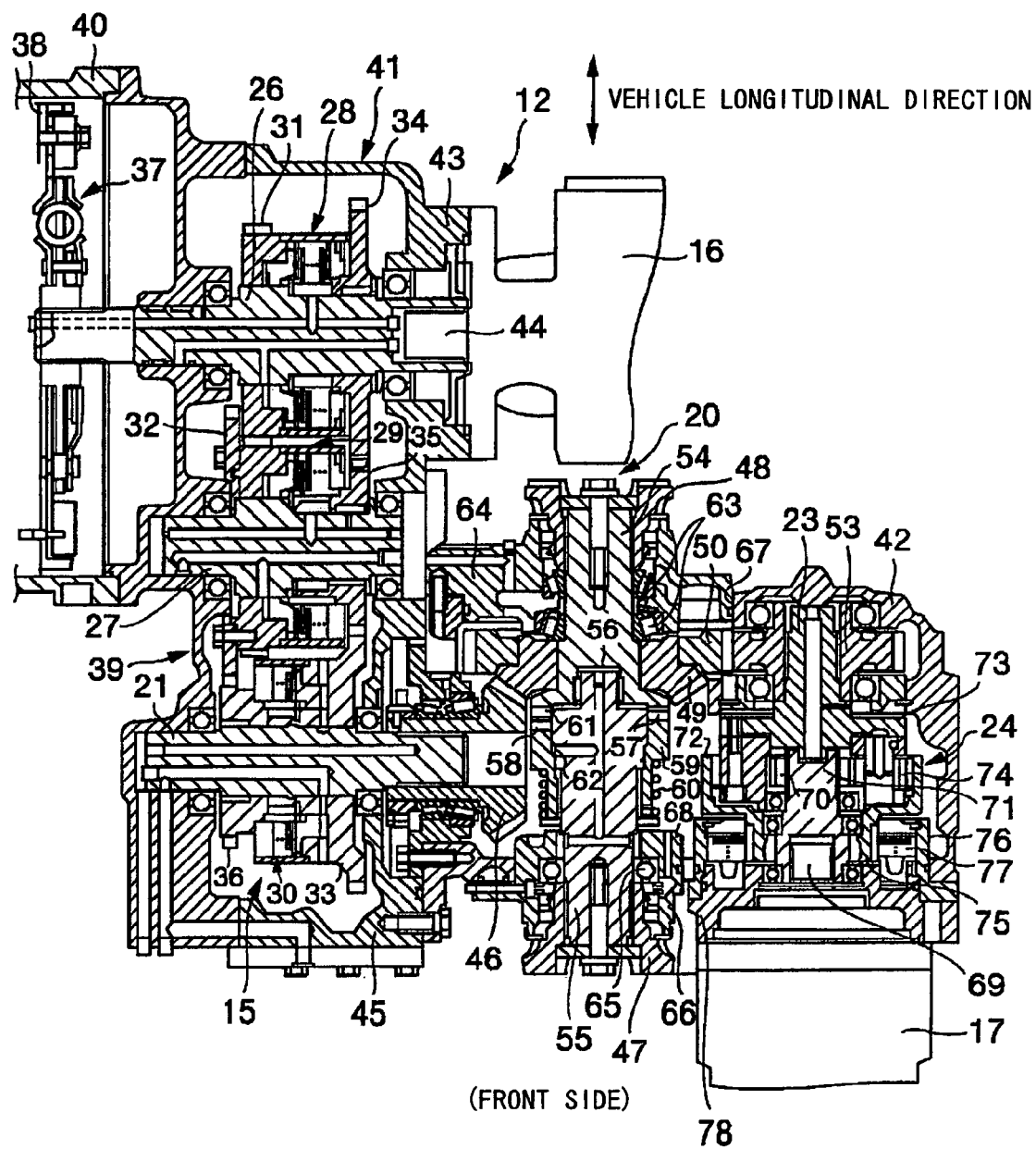
FIG. 4 is a sectional plane view of the transmission according to the embodiment.
Figure 5:
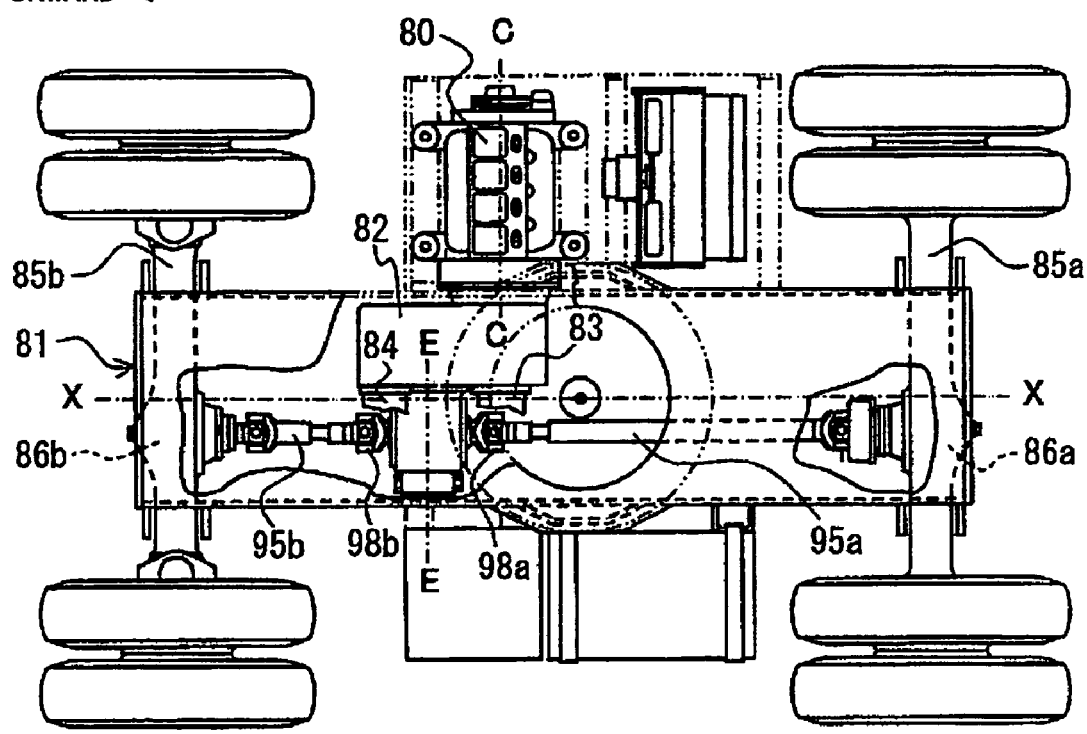
FIG. 5 is a plane view of a base carrier of a wheel type working vehicle according to a prior art.
Figure 6:
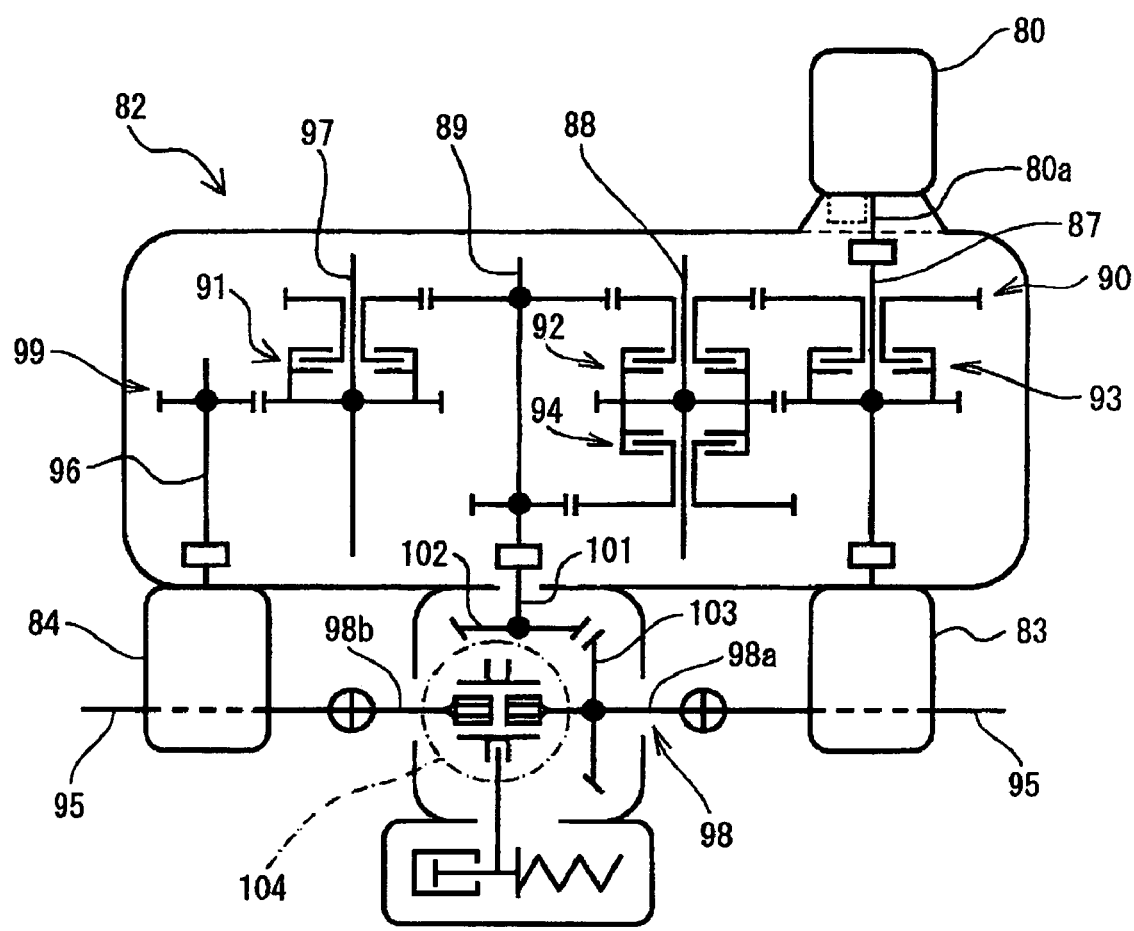
FIG. 6 is a schematic view of a power train according to the prior art.

As shown in FIG. 4, the transmission housing 39 has a mechanical transmission housing 41 provided extensively in the vehicle longitudinal direction, and a power output housing 42 provided extensively in a direction orthogonal to the vehicle longitudinal direction. The housings 41 and 42 are formed to be separate bodies respectively, and connected to each other in substantially a L-shape in plane view. The mechanical transmission housing 41 contains the transmission mechanism 15 and has a pump mounting seat 43 around an area where the input shaft 26 of the transmission mechanism 15 faces an outside. An input shaft 44 of the hydraulic pump 16 is connected to the input shaft 26, and the hydraulic pump 16 is mounted to the mechanical transmission housing 41 with a hydraulic pump housing mounting part being placed on the pump mounting seat 43.

The mechanical transmission housing 41 has a housing mounting seat 45 around an area where the output shaft 21 of the transmission mechanism 15 faces the outside. The power output housing 42 is placed in the state in which it extends in the axis direction of the output shaft 21, and mounted to the housing mounting seat 45. A bevel gear 46 at an input side of the bevel gear mechanism 22, which connects to the output shaft 21, is rotatably placed at an entrance side of the housing in the power output housing 42. The driving output shaft 20 is rotaly mounted such that the axis direction of the driving output shaft 20 is orthogonal to the axis direction of the output shaft 21 of the transmission mechanism 15, and is disposed in the vehicle longitudinal direction. The hydraulic power transmission mechanism 24 connected to the hydraulic motor 17 is placed in the power output housing 42 in the direction in which the axis direction of the mechanism 24 is parallel with the axis of the driving output shaft 20.

The driving output shaft 20 includes the propeller shaft joints 47 and 48 at the front and rear end portions, a bevel gear 49 at an output side of the bevel gear mechanism 22, and the cylindrical gear 50 at one side of the cylindrical gear transmission mechanism 25. The propeller shaft joints 47 and 48 are respectively connected to the front wheel propeller shaft 18 and the rear wheel propeller shaft 19 respectively connected to a front wheel differential device 52 and a rear wheel differential device 52 as shown in FIG. 3. The bevel gear 49 is meshed with the bevel gear 46 provided in the power output housing 42, so that the mechanical driving force from the transmission mechanism 15 is transmitted to the driving output shaft 20. The cylindrical gear 50 is meshed with the cylindrical gear 53 provided at the output shaft 23 of the hydraulic power transmission mechanism 24, so that the hydraulic driving force by the hydraulic motor 17 is transmitted to the driving output shaft 20.

The driving output shaft 20 is divided into a rear wheel driving output shaft 54 including the bevel gear 49 and the cylindrical gear 50 for transmitting and outputting rotating power to the rear wheels, and a front wheel driving output shaft 55 for transmitting and outputting the rotating power to the front wheels. A female and male engaging part 56 (see FIG. 4) is formed on opposing end surface at which the front wheel driving output shaft 55 and the rear wheel driving output shaft 54 face each other, and the front wheel driving output shaft 55 is matched to the rear wheel driving output shaft 54 in the state in which it is freely rotated with respect to the rear wheel driving output shaft 54. Further, the front wheel driving output shaft 55 is constituted to connect to the rear wheel driving output shaft 54 selectively via a jaw clutch mechanism 57, thereby making it possible to switch between the second drive and the fourth drive.

The jaw clutch mechanism 57 is engaged with an outer circumference surface of the front wheel driving output shaft 55 by spline and slidable in an axial direction. The jaw clutch mechanism 57 has a cylinder clutch 59 having an engaging claw 58 in a convex shape in a diameter direction at its opposing end surface to the rear wheel driving output shaft 54, a spring 60, which is provided between a stepped end surface of an outer circumference surface of the front wheel driving output shaft 55 and a stepped end surface of an outer circumference surface of the cylinder clutch 59, and biases the cylinder clutch 59 in a direction toward the rear wheel driving output shaft 54, an annular claw 61 in a convex shape in a diameter direction, which is formed at an end surface of the rear wheel driving output shaft 54 opposing the engaging claw 58 of the cylinder clutch 59, and a hydraulic pressure receiving chamber 62 for moving the cylinder clutch 59, which is formed between an inner circumference surface of the cylinder clutch 59 and the outer circumference surface of the front wheel driving output shaft 55. An oil path communicating with the hydraulic pressure receiving chamber 62 is formed inside the front wheel driving output shaft 55. When oil is poured into the oil pressure receiving chamber 62 from this oil path, the cylinder clutch 59 overcomes the biasing force of the spring 60 and moves downward in FIG. 4. In FIG. 4, the left half surface of the cylinder clutch 59 shows a descending state. Due to this, engagement of the engaging claw 58 of the cylinder clutch 59 and the annular claw 61 of the rear wheel driving output shaft 54 is released.

The rear wheel driving output shaft 54 is rotatably supported by a rotating supporter 64 having a taper cylindrical bearing (first bearing) 63. The front wheel driving output shaft 55 is rotatably supported by a rotating supporter 66 having a ball bearing (second bearing) 65. Tow openings 67 and 68 are coaxially formed to oppose each other in the power output housing 42, and the rotating supporter 64 is mounted to the one opening 67 to position the rear wheel driving output shaft 54 rotaly with respect to the power output housing 42. The rotating supporter 66 is mounted to the other opening 68 to position the front wheel driving output shaft 55 rotatably with respect to the power output housing 42.

The hydraulic power transmission mechanism 24 connected to the hydraulic motor 17 has a carrier output type of planetary gear deceleration mechanism, and the output shaft 23 with a cylindrical gear 53, which is integrally connected to an output carrier of the planetary gear deceleration mechanism. The planetary gear deceleration mechanism has a sun gear 70 attached to an input shaft 71 connected to an output shaft 69 of the hydraulic motor 17, a ring gear 72 and a planetary carrier 73 held at the input shaft 71 to be freely rotatable, a planetary gear 74 supported by the planetary carrier 73 and meshed with the sun gear 70 and a ring gear 72, and a hydraulically operating clutch 77 provided between a clutch inner cylinder 75 integrally formed at the ring gear 72 and a clutch outer cylinder 76 fixed at the power output housing 42.

Rotation of the ring gear 72 is stopped by engagement of the hydraulically operating clutch 77, and the rotating power of the hydraulic motor 17 is outputted from the planetary carrier 73 by rotation and revolution of the planetary gear 74. The output shaft 23 is positioned in the axial direction of the input shaft 71, and rotatably held by the power output housing 42. The hydraulic motor 17 has its output shaft 69 placed coaxially with the axis direction of the input shaft 71 and the output shaft 23 of the planetary gear reducer, and is mounted to a motor mounting part 78 included in the power output housing 42.

The transmission according to the present invention with the above constitution performs a normal and reverse rotation control of the hydraulic motor 17 to engage the hydraulically operating clutch 77 of the hydraulic power transmission mechanism 24 connected to the output shaft 69 of the hydraulic motor 17. As a result, a hydraulic driving force of the forward and reverse first speed gear is transmitted to the front and rear wheel driving output shafts 55 and 54 via the san gear 70, the planetary gear 74, and the planetary carrier 73 of the planetary gear deceleration mechanism, and the output shaft 23 and the cylindrical gear 53. By cutting off the hydraulically operating clutch 77 of the hydraulic power transmission mechanism and engaging the intermediate shaft transmission clutch 29 of the transmission mechanism 15, a mechanical drive traveling speed of the forward second speed gear is transmitted to the rear wheel driving output shaft 54 via the output shaft 21, the bevel gear 46 and the bevel gear 49, by engaging the input shaft transmission clutch 28, the mechanical drive traveling speed of the forward third speed gear is transmitted to the rear wheel driving output shaft 54 via the output shaft 21, the bevel gear 46 and the bevel gear 49, and by engaging the output shaft transmission clutch 30, the mechanical drive traveling speed of the forward fourth speed is transmitted to the rear wheel driving output shaft 54 via the output shaft 21, the bevel gear 46 and the bevel gear 49.

According to the present invention, the following effects are obtained. The transmission system of the hydraulic driving force by the hydraulic motor is made independent from the power transmission system of the mechanical transmission mechanism, and an exclusive hydraulic power transmission mechanism is provided. As a result, the mechanical driving force from the output shaft of the mechanical transmission mechanism is transmitted to the front and rear wheel driving output shaft for transmitting the power to the front and rear wheels via the bevel gear transmission mechanism. Consequently, the hydraulic driving force being large torque drive at a low speed by the hydraulic motor of the hydraulic power transmission mechanism is directly transmitted via the cylindrical gear transmission mechanism without being transmitted via the bevel gear transmission mechanism, and therefore the bevel gear transmission mechanism can be made compact.

The bevel gear of the bevel gear transmission mechanism and the cylindrical gear of the cylindrical gear transmission mechanism are included at the front and rear wheel driving output shaft. Consequently, the power from the output shaft of the mechanical transmission mechanism and the power from the output shaft of the hydraulic power transmission mechanism are directly transmitted to the front and rear driving output shaft without being transmitted via the intermediate shaft, and therefore the transmission efficiency can be made higher. In addition, the front and rear wheel driving output shaft is constituted of one shaft, and therefore it can be made compact.

The power output housing for rotatably housing the front and rear wheel driving output shaft and the output shaft of the hydraulic power transmission mechanism is constituted to be a separate body from the mechanical transmission housing for rotatably housing the output shaft of the mechanical transmission mechanism, and the power output housing is integrally mounted to the mechanical transmission housing with a bolt or the like to be attachable and detachable. Consequently, production of the mechanical transmission housing and the power output housing is facilitated.

Out of the transmission housings, the mechanical transmission housing is laid in a direction along the vehicle longitudinal direction, and the power output housing is extensively provided in the direction orthogonal to the vehicle longitudinal direction (namely, the vehicle side direction), which are placed in substantially a L-shape in plane view. Consequently, it is possible to position the axis direction of the front and rear wheel driving output shaft, which is placed in the housing, in the vehicle longitudinal direction, and the front and rear propeller shafts connected to the front and rear driving force output shaft can be also placed in the vehicle longitudinal direction. According to this constitution, the length of the front and rear wheel output shaft can be reduced though the mechanical transmission mechanism part is in a long shape in the vehicle longitudinal direction, and the length of the propeller shaft connected to the front and rear wheel output shaft can be made relatively long. As a result, cross angles of the front and rear propeller shafts and the front and rear wheel axels can be prevented from being large, and therefore the driving force can be efficiently transmitted to the front and rear wheel axels.

The front and rear driving output shaft is divided into the front wheel driving output shaft and the rear wheel driving output shaft, and the portion between both the output shafts is selectively separated and connected via the clutch. As a result, four types of drive traveling, that are mechanical drive traveling and hydraulic drive traveling by the two rear wheels, and mechanical drive traveling and hydraulic drive traveling by four front and rear wheels, are made possible, and traveling performance of the working vehicle can be adapted correspondingly to the conditions of the traveling area and the working state.

The two drive to four drive switching type of rear wheel driving output shaft is mounted on the rotating supporter having the bearing (the taper cylindrical bearing in the above-described embodiment is one example), and the front wheel driving output shaft is mounted on the rotating supporter having the bearing (the ball bearing in the above-described embodiment is one example). The rotating supporters of the rear wheel driving output shaft and the front wheel driving output shaft are mounted in the two openings formed to oppose the power output housing coaxially to be attachable and datable respectively. As a result, the two drive to four drive switching type of rear wheel driving output shaft and the front wheel driving output shaft, and the bevel gear connected to the output shaft of the mechanical transmission mechanism can be mounted to and dismounted from the power output housing as units via the rotating supporters, respectively, and therefore assembly and disassembly are facilitated.

The hydraulic power transmission mechanism includes the planetary gear type deceleration mechanism, and the output shaft integrally connected to the rotation center of the planetary carrier of the planetary gear type deceleration mechanism, and therefore the hydraulic power transmission mechanism becomes compact in the radius direction.

What is claimed is:

1. A transmission for a wheel type working vehicle in which a mechanical transmission mechanism for mechanically transmitting power, and a hydraulic power transmission mechanism having a hydraulic pump and a hydraulic motor driven by said hydraulic pump to transmit hydraulic transmission power are provided side by side as power transmission mechanisms for transmitting power of an engine to front and rear wheels via a front and rear wheel driving output shaft, wherein an output shaft of said mechanical transmission mechanism is provided in a direction orthogonal to a vehicle longitudinal direction;

wherein said front and rear wheel driving output shaft and an output shaft of said hydraulic power transmission mechanism are provided in the vehicle longitudinal direction;

wherein power from the output shaft of said mechanical transmission mechanism is transmitted to said front and rear wheel driving output shaft via a bevel gear transmission mechanism; and wherein power from the output shaft of said hydraulic power transmission mechanism is transmitted to said front and rear wheel driving output shaft via a cylindrical gear transmission mechanism.

2. The transmission for the wheel type working vehicle according to claim 1, wherein said bevel gear transmission mechanism meshes a bevel gear provided at said front and rear wheel driving output shaft with a bevel gear connected to the output shaft of said mechanical transmission mechanism; and wherein said cylindrical gear transmission mechanism meshes a cylindrical gear provided at said front and rear wheel driving output shaft with a cylindrical gear provided at the output shaft of said hydraulic power transmission mechanism.

3. The transmission for the wheel type working vehicle according to claim 2, further comprising:

a mechanical transmission housing, which rotatably houses the output shaft of said mechanical transmission mechanism, and to which said hydraulic pump is mounted; and a power output housing, which rotatably houses said front and rear wheel driving output shaft and the output shaft of said hydraulic power transmission mechanism, and to which said hydraulic motor is mounted, wherein said mechanical transmission housing and said power output housing are constituted to be separate bodies, and are integrally mounted to be attachable and detachable.

4. The transmission for the wheel type working vehicle according to claim 3, wherein said front and rear wheel driving output shaft comprises a rear wheel driving output shaft which has said bevel gear and said cylindrical gear and always transmits rotating power to the rear wheels, and a front wheel driving output shaft which is selectively separated from or connected to said rear wheel driving output shaft via a clutch mechanism, and selectively transmits the rotating power to the front wheels, and wherein said clutch mechanism makes it possible to switch between two drive and four drive.

5. The transmission for the wheel type working vehicle according to claim 4, wherein said rear wheel driving output shaft is fitted to a rotating supporter at a rear wheel side via a first bearing;

wherein said front wheel driving output shaft is fitted to a rotating supporter at a front wheel side via a second bearing; and wherein said rotating supporters at the rear wheel side and the front wheel side are respectively mounted to said power output housing to be attachable and detachable.

6. The transmission for the wheel type working vehicle according to claim 1, wherein said hydraulic power transmission mechanism comprises a planetary gear type deceleration mechanism for stopping rotation of a ring gear by engagement of a hydraulic operating clutch and outputting rotating power of said hydraulic motor from a planetary carrier via a sun gear included at an input shaft connected to an output shaft of said hydraulic motor by rotation and revolution of a planetary gear, and the output shaft of said hydraulic power transmission mechanism, which is provided on a same axis as that of said input shaft and integrally connected to said planetary carrier.

7. The transmission for the wheel type working vehicle according to claim 2, wherein said front and rear wheel driving output shaft comprises a rear wheel driving output shaft which has said bevel gear and said cylindrical gear and always transmits rotating power to the rear wheels, and a front wheel driving output shaft which is selectively separated from or connected to said rear wheel driving output shaft via a clutch mechanism, and selectively transmits the rotating power to the front wheels, and wherein said clutch mechanism makes it possible to switch between two drive and four drive.

8. The transmission for the wheel type working vehicle according to claim 7, wherein said rear wheel driving output shaft is fitted to a rotating supporter at a rear wheel side via a first bearing;

wherein said front wheel driving output shaft is fitted to a rotating supporter at a front wheel side via a second bearing; and wherein said rotating supporters at the rear wheel side and the front wheel side are respectively mounted to said power output housing to be attachable and detachable.

9. The transmission for the wheel type working vehicle according to claim 2, wherein said hydraulic power transmission mechanism comprises a planetary gear type deceleration mechanism for stopping rotation of a ring gear by engagement of a hydraulic operating clutch and outputting rotating power of said hydraulic motor from a planetary carrier via a sun gear included at an input shaft connected to an output shaft of said hydraulic motor by rotation and revolution of a planetary gear, and the output shaft of said hydraulic power transmission mechanism, which is provided on a same axis as that of said input shaft and integrally connected to said planetary carrier.

10. The transmission for the wheel type working vehicle according to claim 3, wherein said hydraulic power transmission mechanism comprises a planetary gear type deceleration mechanism for stopping rotation of a ring gear by engagement of a hydraulic operating clutch and outputting rotating power of said hydraulic motor from a planetary carrier via a sun gear included at an input shaft connected to an output shaft of said hydraulic motor by rotation and revolution of a planetary gear, and the output shaft of said hydraulic power transmission mechanism, which is provided on a same axis as that of said input shaft and integrally connected to said planetary carrier.

* * * * *